United States Patent
Rugina et al.

(10) Patent No.: US 11,586,567 B2
(45) Date of Patent: Feb. 21, 2023

(54) TECHNIQUES FOR VIRTUALIZING PF-VF MAILBOX COMMUNICATION IN SR-IOV DEVICES

(71) Applicant: VMWARE, INC., Palo Alto, CA (US)

(72) Inventors: Radu Rugina, Palo Alto, CA (US); Vivek Mohan Thampi, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 306 days.

(21) Appl. No.: 16/817,653

(22) Filed: Mar. 13, 2020

(65) Prior Publication Data
US 2021/0209040 A1 Jul. 8, 2021

(30) Foreign Application Priority Data
Jan. 7, 2020 (IN) .............................. 202041000663

(51) Int. Cl.
  *G06F 9/455* (2018.01)
  *G06F 13/20* (2006.01)
  *G06F 11/07* (2006.01)

(52) U.S. Cl.
  CPC .......... *G06F 13/20* (2013.01); *G06F 9/45558* (2013.01); *G06F 11/0745* (2013.01); *G06F 11/0751* (2013.01); *G06F 11/0772* (2013.01); *G06F 2009/4557* (2013.01); *G06F 2009/45579* (2013.01)

(58) Field of Classification Search
  CPC ....... G06F 2009/45579; G06F 11/0745; G06F 11/0751; G06F 11/0772
  See application file for complete search history.

(56) References Cited

U.S. PATENT DOCUMENTS

| | | | |
|---|---|---|---|
| 8,146,082 B2 | 3/2012 | Belay | |
| 9,197,489 B1 | 11/2015 | Vincent | |
| 9,928,107 B1 | 3/2018 | Vincent | |
| 10,554,485 B2* | 2/2020 | Wen | H04L 41/0803 |
| 10,860,363 B1 | 12/2020 | Gabrielson | |
| 10,901,768 B1 | 1/2021 | Mandadi et al. | |
| 10,970,099 B2* | 4/2021 | Jain | G06F 9/45537 |

(Continued)

OTHER PUBLICATIONS

Vmware, Inc. "vSphere Networking," Product Documentation, 2016, pp. 86-96.

(Continued)

*Primary Examiner* — Joseph O Schell
(74) *Attorney, Agent, or Firm* — Kim & Stewart LLP

(57) ABSTRACT

A virtual machine (VM) has direct access to an I/O device having physical and virtual functions and a mailbox register, and includes a guest driver for controlling the virtual functions. The VM runs on system software that includes a physical driver for controlling the physical function (PF) and maintains VM page tables, which include an entry that references a memory space into which the mailbox register is mapped. The system software registers a callback function with the physical driver, which the physical driver invokes upon receiving a trigger for communication with the guest driver. In response, the system software alters the page tables so that access to the mailbox register causes a PF intercept, and the callback function handles the communication with the guest driver. After completion of the communication, the system software alters the page tables so that access to the mailbox register does not cause a PF intercept.

20 Claims, 15 Drawing Sheets

(56) References Cited

U.S. PATENT DOCUMENTS

| | | |
|---|---|---|
| 2007/0271560 A1 | 11/2007 | Wahlert et al. |
| 2008/0294808 A1* | 11/2008 | Mahalingam ........... G06F 13/24 710/26 |
| 2009/0007105 A1 | 1/2009 | Fries et al. |
| 2010/0211827 A1* | 8/2010 | Moyer ................ G06F 11/3636 714/E11.203 |
| 2011/0179414 A1* | 7/2011 | Goggin ............... G06F 9/45558 718/1 |
| 2012/0254862 A1 | 10/2012 | Dong |
| 2014/0229769 A1* | 8/2014 | Abraham .............. G06F 13/102 714/43 |
| 2019/0108106 A1* | 4/2019 | Aggarwal ............ G06F 9/45558 |
| 2019/0243672 A1 | 8/2019 | Yadav et al. |
| 2019/0361728 A1* | 11/2019 | Kumar .................... H04L 67/34 |
| 2021/0064408 A1 | 3/2021 | Gill |

OTHER PUBLICATIONS

Notice of Allowance dated Aug. 26, 2022 in U.S. Appl. No. 16/807,188, 21 pages.

* cited by examiner

TECHNIQUES FOR VIRTUALIZING PF-VF MAILBOX COMMUNICATION IN SR-IOV DEVICES

RELATED APPLICATIONS

Benefit is claimed under 35 U.S.C. 119(a)-(d) to Foreign Application Serial No. 202041000663 filed in India entitled "TECHNIQUES FOR VIRTUALIZING PF-VF MAILBOX COMMUNICATION IN SR-IOV DEVICES", on Jan. 7, 2020, by VMware, Inc., which is herein incorporated in its entirety by reference for all purposes.

BACKGROUND

Virtualization of I/O devices poses challenges. Currently, software performs virtualization of an I/O device by interposing itself between a driver for the I/O device running in a guest operating system (OS) and the underlying hardware I/O device. When triggered by a guest memory access, the virtualization software parses I/O commands, translates the guest addresses into host physical addresses and ensures that referenced memory pages are present in memory. Additionally, the virtualization software serializes multiple I/O requests from all virtual machines into a single I/O stream to be handled by the underlying hardware, thereby sharing the underlying hardware among all of the virtual machines. However, CPU overhead is needed to implement the software virtualization of the I/O device, and such overhead reduces the throughput that the I/O device is capable of delivering.

An alternative to software virtualization is direct assignment. In direct assignment, the physical I/O device is controlled directly by a native driver in the guest OS. The result is a major improvement in performance because no software intervention is involved. However, direct assignment has a limitation in that the I/O device cannot be shared among virtual machines (VMs). The physical I/O device is assigned to only one VM.

Thus, I/O virtualization that allows sharing of I/O devices, as well as high performance of the I/O devices, is needed.

Single root I/O virtualization (SR-IOV) is an attempt to answer this need. SR-IOV provides two new functions types, physical functions, and virtual functions. Physical functions (PFs) manage the entire SR-IOV device. Virtual functions (VFs) are numerous lightweight versions of the SR-IOV device sufficient to support several VMs, thereby allowing sharing of the physical I/O device among VMs and direct access to the virtual functions by the VMs.

However, while SR-IOV devices solve the problem of sharing and high performance by allowing VMs, through guest VF drivers installed therein, to have direct access to sharable virtual functions, another difficulty emerges. With direct access (i.e., bypassing the virtualization software), the virtualization software lacks information about the state of the SR-IOV device. In addition, guest VF drivers may be exchanging messages with a host PF driver to acquire information about the capabilities of the underlying hardware, but the virtualization software is unaware about the state of these communications. The virtualization software needs information about the state of the SR-IOV device and the communications between the PF driver and the guest VF drivers to perform several functions. First, the virtualization software may need information about the state of the SR-IOV so that it can standardize the view of the SR-IOV device and its capabilities to the VMs using the device. Second, the virtualization software needs information about the SR-IOV device to perform checkpointing of a VM, which includes suspending the VM, taking a snapshot of the VM, and possibly migrating the VM to a different host. Checkpointing of a VM is complex because the state of communications between the PF and the VFs is maintained in multiple layers of software, including the guest VF driver, the host PF driver, and the hardware. Complete emulation of the SR-IOV device could handle the complexity of checkpointing, but complete emulation would defeat the direct access feature between the VF driver and the SR-IOV device. Third, the virtualization software needs information about the SR-IOV device to handle an error condition that the SR-IOV may experience so that the virtualization software can inform other parts of that software of the error condition.

It would be an advantage to employ SR-IOV devices in a way that allows the virtualization software to keep informed of the state of the SR-IOV device so that the virtualization software can carry out functions of providing a uniform view of an I/O device, of checkpointing the VM, and of notifying other parts of the virtualization software of error conditions of the SR-IOV device.

SUMMARY

According to one or more embodiments, a VM has direct access to an I/O device, e.g., SR-IOV device, having a physical function, virtual functions, and a mailbox register for communication, and includes a guest driver for controlling one or more of the virtual functions. The VM runs on system software (e.g., hypervisor) that includes a physical driver for controlling the physical function (PF) of the I/O device and maintains page tables for the virtual machine, the page tables including an entry that references a memory space into which the mailbox register is mapped. The system software handles the communication between the VM and the I/O device by registering a PF intercept callback function with the physical driver, wherein the PF intercept callback function is to be invoked by the physical driver when the guest driver initiates communication via the mailbox register. When the guest driver initiates communication via the mailbox register and the physical driver invokes the PF intercept callback function in response thereto, the system software alters the entry in the page tables so that the guest driver accesses to the mailbox register are intercepted by the system software. The system software emulates the mailbox communication with the guest driver via the mailbox register when the guest driver accesses to the mailbox register are intercepted. Upon completion of the communication with the guest driver, the system software alters the entry in the page tables so that the guest driver accesses to the mailbox register are no longer intercepted and direct operation of the I/O device by the guest driver resumes.

Further embodiments include a computer system configured to carry out one or more aspects of the above method, and a non-transitory computer-readable storage medium containing computer-readable code executable by one or more computer processors to carry out one or more aspects of the above method.

DETAILED DESCRIPTION

Described herein are embodiments that maintain direct access communication by a device driver of an I/O device having a physical function and a plurality of virtual functions. The direct access is subject to intervention by the virtualization software using callbacks so that a uniform view of the virtual function, checkpointing of a virtual machine and error reporting can still be carried out by the virtualization software.

Figure 1A:
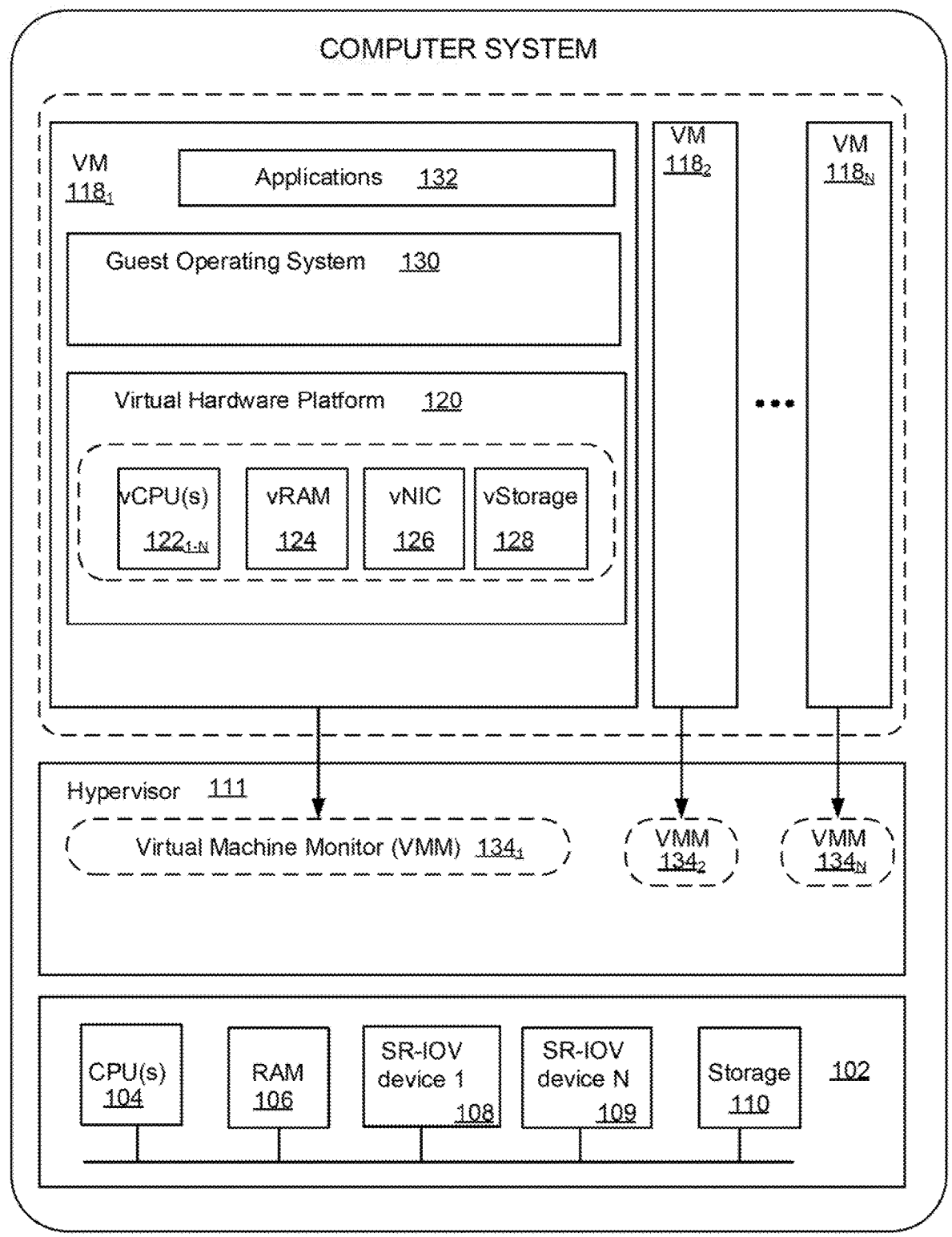
FIG. 1A depicts a block diagram of a computer system that is representative of a virtualized computer architecture in which embodiments may be implemented.

FIG. 1A depicts a block diagram of a computer system 100 that is representative of a virtualized computer architecture in which embodiments may be implemented. As is illustrated, computer system 100 hosts multiple virtual machines (VMs) $118_1$-$118_N$ that run on and share a common hardware platform 102. Hardware platform 102 includes conventional computer hardware components, such as one or more items of processing hardware such as central processing units (CPUs) 104, a random access memory (RAM) 106, one or more single-root, I/O virtualization (SR-IOV) devices 108, 109 and persistent storage 110. In one embodiment, one of the SR-IOV devices 108, 109 is a physical network interface controller (pNIC) and another one of the SR-IOV devices 108, 109 is a co-processor that accelerates and compresses cryptographic workloads, e.g., Intel® QAT (Quick Assist Technology).

A virtualization software layer, referred to hereinafter as hypervisor 111, is installed on top of hardware platform 102. Hypervisor 111 makes possible the concurrent instantiation and execution of one or more virtual machines (VMs) $118_1$-$118_N$. The interaction of a VM $118_{1-N}$ with hypervisor 111 is facilitated by the virtual machine monitors (VMMs) 134. Each VMM $134_1$-$134_N$ is assigned to and monitors a corresponding VM $118_1$-$118_N$. In one embodiment, hypervisor 11 may be a hypervisor implemented as a commercial product in VMware's vSphere® virtualization product, available from VMware Inc. of Palo Alto, Calif. In an alternative embodiment, hypervisor 111 runs on top of a host operating system which itself runs on hardware platform 102. In such an embodiment, hypervisor 111 operates above an abstraction level provided by the host operating system.

After instantiation, each VM $118_1$-$118_N$ encapsulates a virtual computing machine platform that is executed under the control of hypervisor 111. Virtual devices of a VM 118 are embodied in the virtual hardware platform 120, which is comprised of, but not limited to, one or more virtual CPUs (vCPUs) $122_1$-$122_N$, a virtual random access memory (vRAM) 124, a virtual network interface adapter (vNIC) 126, and virtual storage (vStorage) 128. Virtual hardware platform 120 supports the installation of a guest operating system (guest OS) 130, which is capable of executing applications 132. Examples of a guest OS 130 include any of the well-known commodity operating systems, such as the Microsoft Windows® operating system, and the Linux® operating system, and the like.

It should be recognized that the various terms, layers, and categorizations used to describe the components in FIG. 1A may be referred to differently without departing from their functionality or the spirit or scope of the disclosure. For example, VMMs $134_1$-$134_N$ may be considered separate virtualization components between VMs $118_1$-$118_N$ and hypervisor 111 since there exists a separate VMM for each instantiated VM. Alternatively, each VMM may be considered to be a component of its corresponding virtual machine since each VMM $134_1$-$134_N$ includes the hardware emulation components for the virtual machine. In such an alternative conception, for example, the conceptual layer described as virtual hardware platform 120 may be merged with and into VMM $134_1$-$134_N$.

Figure 1B:
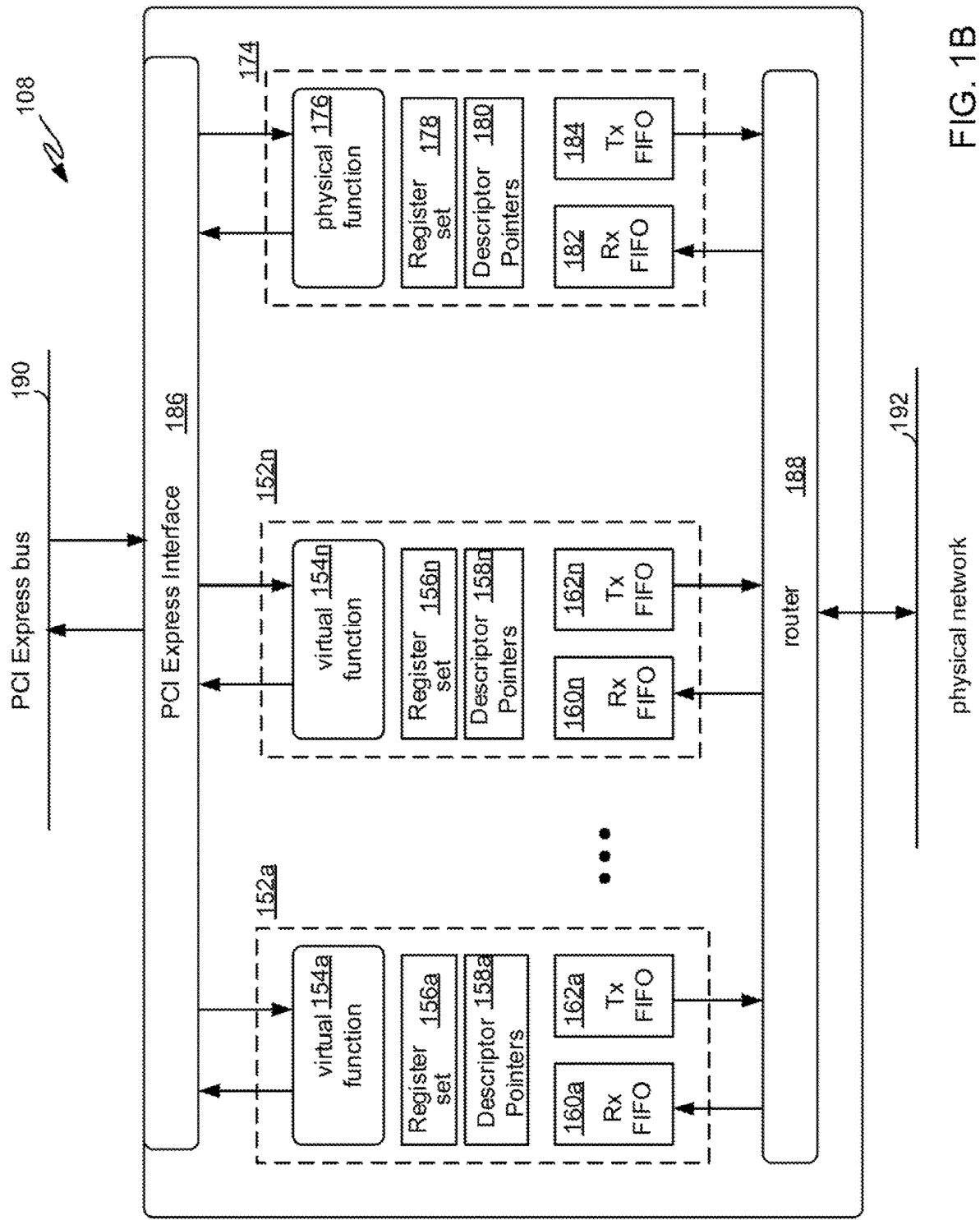
FIG. 1B depicts an example SR-IOV device.

FIG. 1B depicts an example of an SR-IOV device such as SR-IOV device 108. In the figure, SR-IOV device 108 is a physical network interface controller (pNIC), which is used to back vNICs 126 in virtual machines $118_1$-$118_N$. Included in SR-IOV device 108 are a number of virtual function (VF) devices 152a-n and a physical function (PF) device 174. Each of the VF devices 152a-n and PF device 174 are connected to a PCI Express (PCIe) bus interface 186 that is connected to a PCIe bus 190 of computer system 100 and to a router 188 that is connected to a physical network 192, such as an Ethernet cable.

Physical function (PF) 176 of PF device 174 is a portion of SR-IOV device 108 that has full PCIe functions and includes a register set 178, a set of descriptor pointers 180, a receive FIFO 182, and a transmit FIFO 184. Register set 178 include base address registers (BARs) that divide the memory space of PF 176 into a number of memory areas, a mailbox register, and a doorbell register. The set of descriptor pointers 180 points to descriptors that configure the transfers performable by PF device 174. Receive FIFO 182 and transmit FIFO 184 buffer the data in transit between physical network 192 and RAM 106 that is connected to PCIe bus 190.

Each virtual function (VF) 154a-n implements lightweight PCIe functions that include the resources necessary for data movement and a minimized set of configuration resources. Each VF 154a-n has its register set 156a-n, which includes a set of BARs, a mailbox register, and a doorbell register, a set of descriptor pointers 158a-n, receive FIFO 160a-n, and transmit FIFO 162a-n. One or more VF devices 152a-n are associated with one of VMs $118_1$-$118_N$.

To receive an incoming packet, the pNIC device (which is SR-IOV device 108) operates as follows. Upon arrival of a network packet, the packet is sent to router 188 which routes the packet to a receive FIFO 160a-n of one of VF devices 152a-n, and then the pNIC device initiates a DMA operation between FIFO 160a-n and RAM 106 of computer system 100, the target memory address for the DMA operation having been defined by one or more descriptor pointers in VF device 152a-n. When the DMA transfer is complete, the packet resides in RAM 106 of computer system 100 after which the pNIC device generates an interrupt to one of the CPUs 104 of computer system 100 indicating that the packet has arrived.

To transmit a packet, the pNIC device fetches one or more descriptor pointers describing the transaction from RAM 106 of computer system 100, and then the pNIC device fetches the packet data from RAM 106 at a target address specified by one of the descriptor pointers 158a-n and loads the packet data into transmit FIFO 162a-n of one of VF devices 152a-n. Then, the pNIC device transfers the packet data to physical network 192. After the transfer is completed, the pNIC device generates an interrupt to one of the CPUs 104 of computer system 100.

Figure 2:
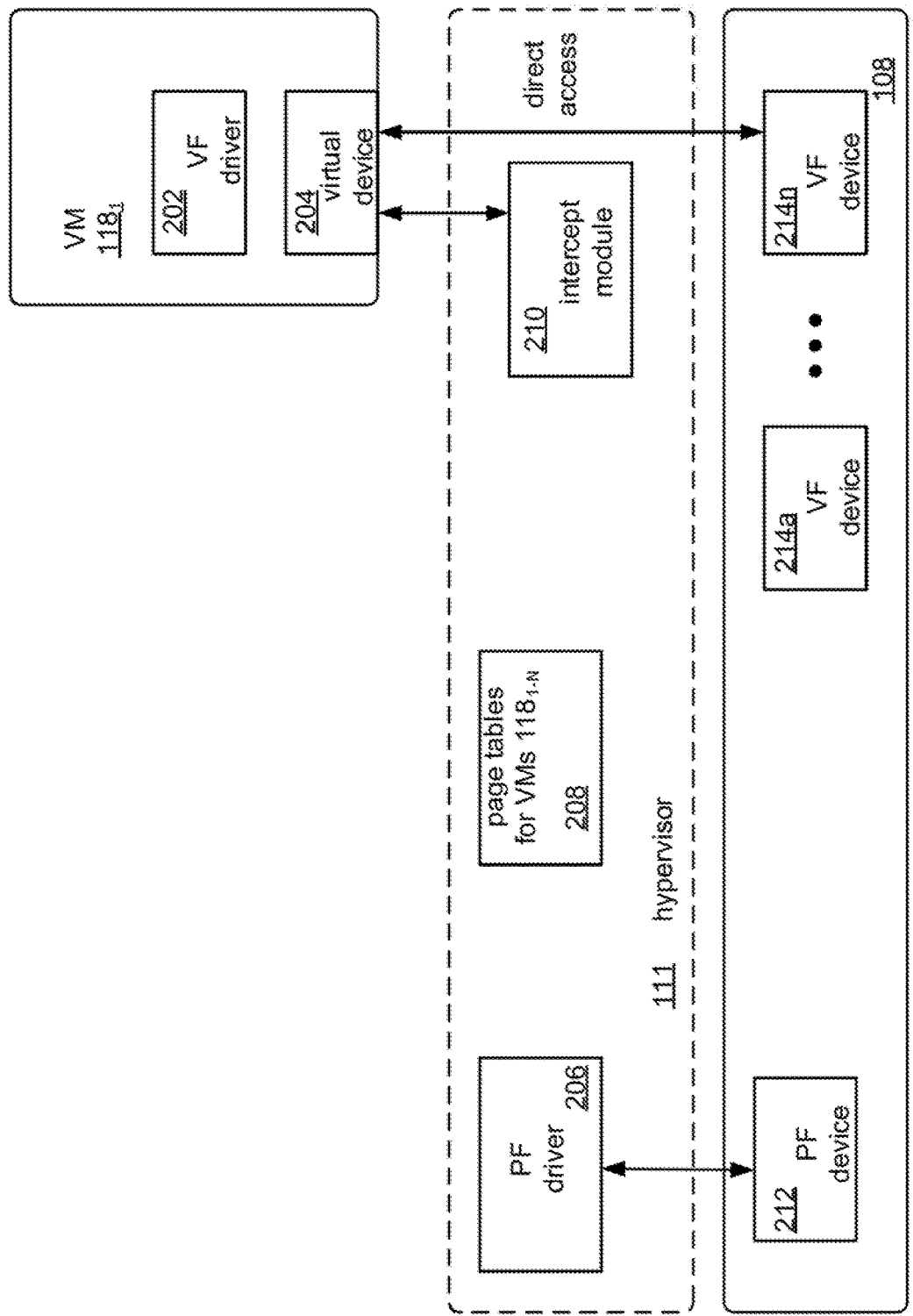
FIG. 2 depicts a view of drivers for the SR-IOV device and a virtual machine running on the computer system.

FIG. 2 depicts a view of drivers for the SR-IOV device and a VM running on a computer system. The figure illustrates the example where SR-IOV device 108 has a PF device 212 and a number of VF devices 214a-n. The figure further includes a PF driver 206 (also called a master driver (MD)), residing in hypervisor 111, page tables 208 for VMs $118_1$-$118_N$, and an intercept module 210 also residing in hypervisor 111. Also depicted is a VM $118_1$ that includes a VF driver 202 residing in a guest operating system 130 of VM $118_1$, and a virtual device 204. As shown, VF driver 202 is associated with one of the VF devices 214n which backs virtual device 204.

PF driver 206 is a host driver that manages the global functions of SR-IOV device 108 and is responsible for configuring shared resources of SR-IOV device 108. PF driver 206 contains all of the traditional driver functionality to provide access to the I/O resources of SR-IOV device 108 for hypervisor 111. PF driver 206 can also be called upon to perform operations that impact the entire SR-IOV device 108.

Page tables 208 are either (a) page tables mapping virtual addresses of guest operating system 130 to a guest physical space along with extended page tables mapping the guest physical space to physical RAM 106 of computer system 100 or (b) shadow page tables that map virtual addresses of guest operating system 130 to physical RAM 106 of computer system 100.

Intercept module 210 operates intercept communications between VF driver 202 and VF devices 214a-n in SR-IOV device 108 and is described further in relation to FIGS. 4A-4E, 5A-5C and 6A-6C.

VF driver 202 is a driver that realizes only certain functionality available to it, such as being able to configure the descriptor pointers in VF device 214n. VF driver 202 and PF driver 206 exchange messages with each other, the messages including request-response messages (e.g., driver compatibility requests or device capability requests issued by VF driver 202 and answered by PF driver 206) and PF notification messages (e.g., device error notification messages that PF driver 206 issues for VF driver 202, or init/shutdown notifications from VF driver 202 to PF driver 206).

Figure 3A:
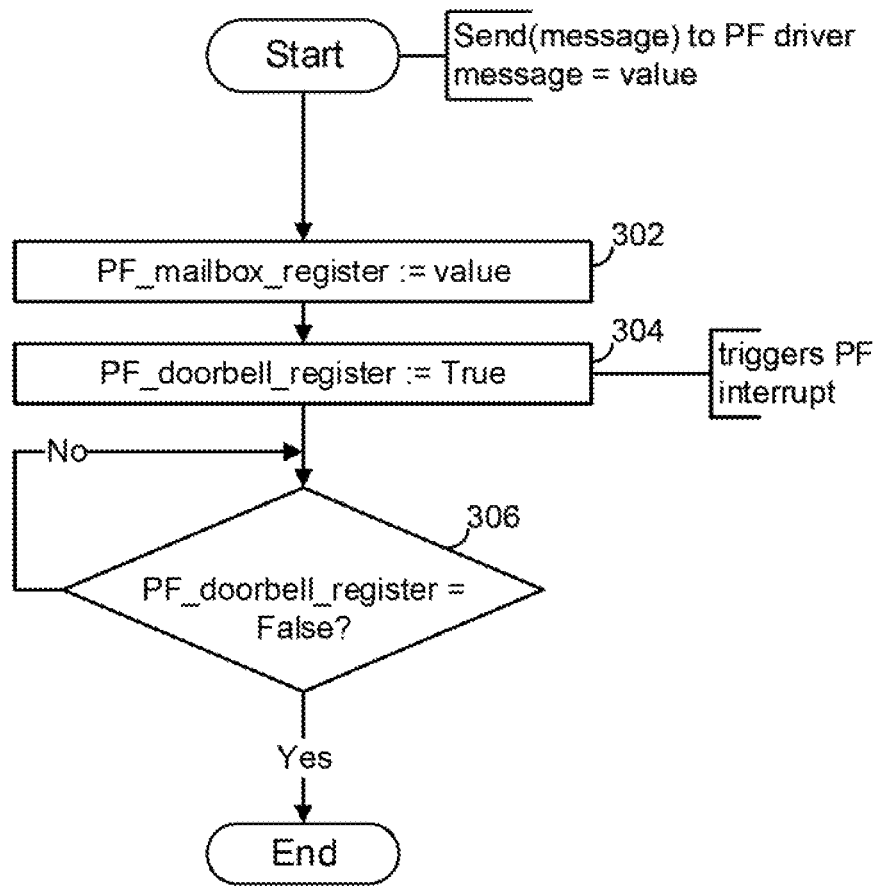
FIGS. 3A and 3B depict flow charts of basic send and receive functions used for communication to the PF driver, in an embodiment.

Referring to FIG. 3A, to send a message to PF driver 206, a Send(message) function is invoked by a sender, such as VF driver 202. In step 302, the function stores the message as a value in the PF_mailbox_register, which is the mailbox register of register set 178. After the message is stored, the function sets to True the PF_doorbell_register, which is the doorbell register in register set 178, in step 304 to cause an interrupt to PF driver 206. In step 306, the function waits for the PF_doorbell_register to be set to False, which indicates that the message was received. Though the Send function is described using registers, other types of communication involving FIFOs or ring buffers can be employed.

Figure 3B:
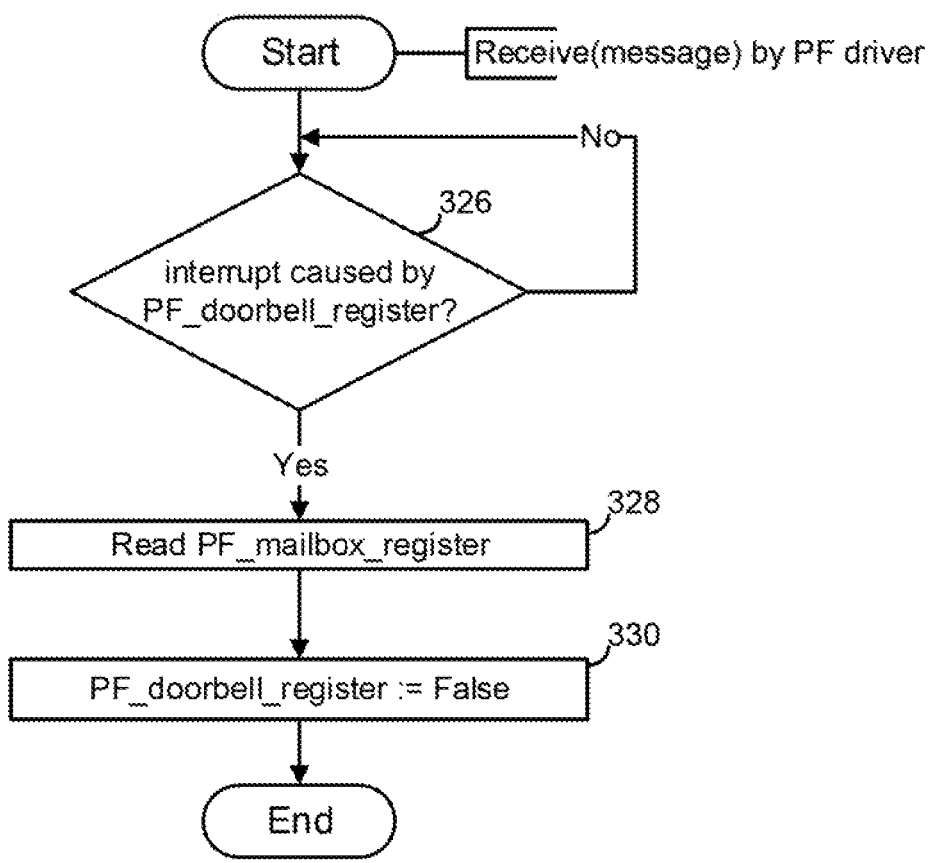

Referring to FIG. 3B, PF driver 206 receives a message according to the Receive(message) function. Upon receiving the interrupt caused by a sender setting the PF_doorbell_register to True in step 326, PF driver 206 reads the PF_mailbox_register in step 328 and in step 330 sets the PF_doorbell_register to False to acknowledge receipt of the message.

Figure 3C:
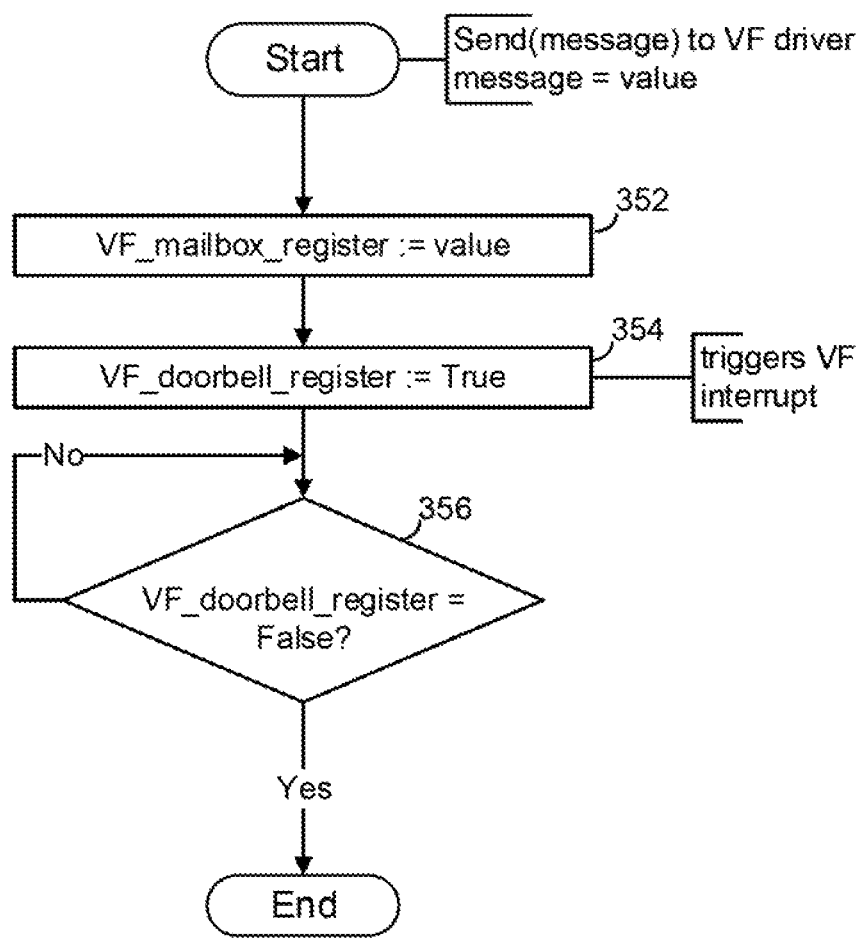
FIGS. 3C and 3D depict flow charts of basic send and receive functions used for communication to the VF driver, in an embodiment.

Referring to FIG. 3C, to send a message to VF driver 202, the Send(message) function is invoked by PF driver 206. In step 352, the function stores the message as a value in the VF_mailbox_register, which is the mailbox register of one of register sets 156a-n. After the message is stored, the function sets to True the VF_doorbell_register, which is the doorbell register of one of register sets 156a-n, in step 354. In step 356, the function waits for the VF_doorbell_register to be set to False, which indicates that the message was received.

Figure 3D:
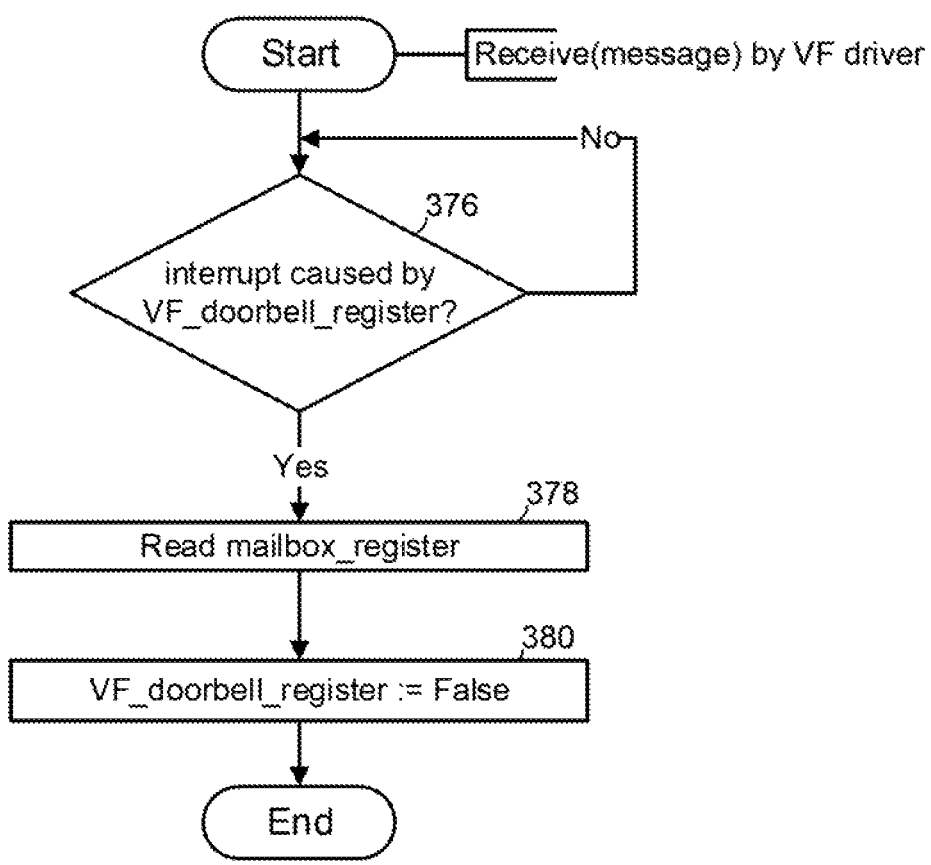

Referring to FIG. 3D, the VF driver 202 receives a message according to the Receive(message) function. Upon receiving the interrupt caused by a sender setting the VF_doorbell_register to True in step 376, VF driver 202 reads the message from the VF_mailbox_register in step 378. In step 380, the function sets the VF_doorbell_register to False to acknowledge receipt of the message.

When the Send and Receive functions use memory-mapped mailbox registers for communication, accesses to those mailbox registers in those functions cause guest memory access intercepts, where a guest memory access intercept is a page permission violation that causes an exit to the hypervisor or a hypervisor page fault. These guest memory access intercepts incur a large overhead. In addition, when many of the memory-mapped mailbox registers reside in the same memory page as other registers used for operating or monitoring the SR-IOV device, then additional guest memory access intercepts are incurred for accesses to registers that may be performance-critical. Incurring guest memory access intercepts when these other registers are accessed leads to increased latency for critical device functions. In the embodiment where SR-IOV device 108 is a co-processor that accelerates and compresses cryptographic workloads, performance-critical registers include registers used to submit the workloads and monitor progress of the submitted workloads.

FIGS. 4A-4D, 5A-5B, 6A-6C depict a flow of operations for reducing the loss in performance when using this method of communication. FIGS. 4A, 4B, 4C, and 4D depict a flow of operations for a request-response operation between PF driver 206 and VF driver 202, in an embodiment.

Figure 4A:
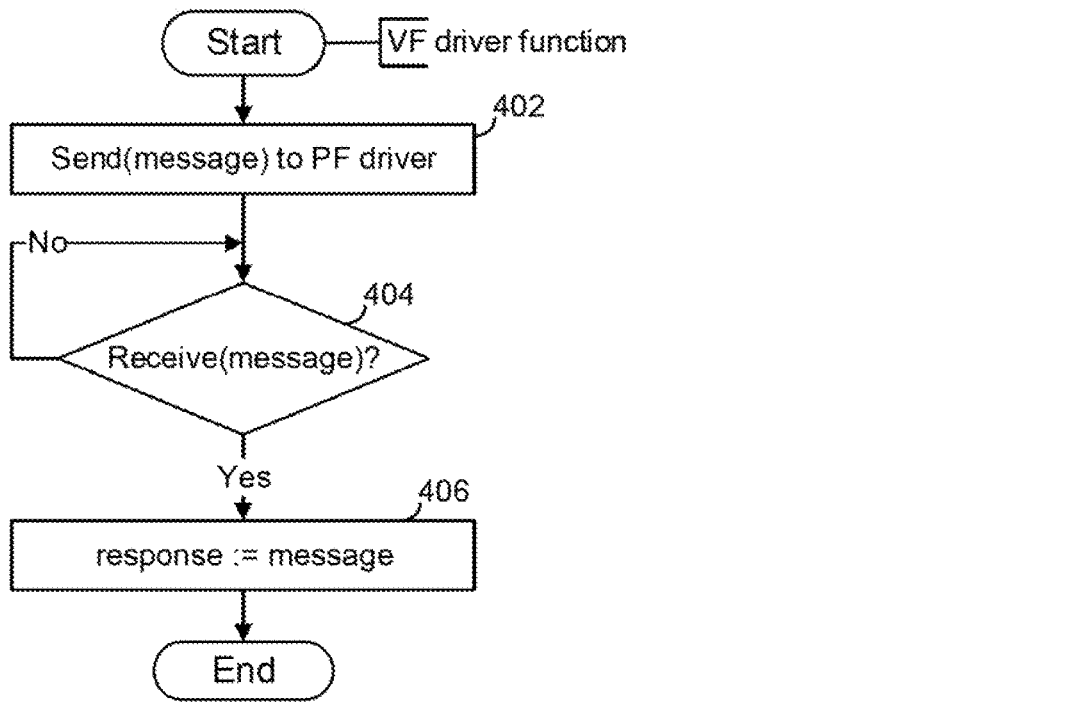
FIGS. 4A, 4B, 4C, and 4D depict a flow of operations for a request-response operation between the PF driver and the VF driver, in an embodiment.

FIG. 4A depicts a flow of operations for VF driver 202 making a request to PF driver 206. In step 402, VF driver 202 calls the Send(message) function to send the message containing the request and in step 404 awaits a response. In step 404, VF driver 202, upon the Receive function indicating that the message is received, obtains the message containing a response and in step 406 assigns the message to the variable 'response' for use by VF driver 202.

Figure 4B:
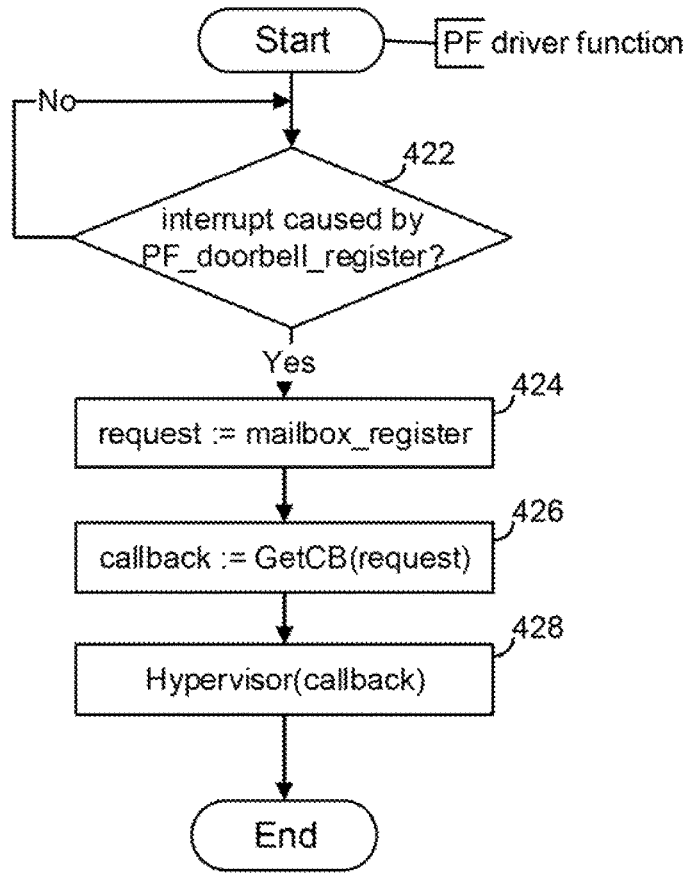

FIG. 4B depicts a flow of operations that PF driver 206 executes upon an interrupt occurring in step 422 indicating that the message containing the request is present. In steps 424 and 426, PF driver 206 obtains the request from the message and obtains a callback function using the GetCB function. In step 428, PF driver 206 calls hypervisor 111 using the callback function as a parameter.

Figure 4C:
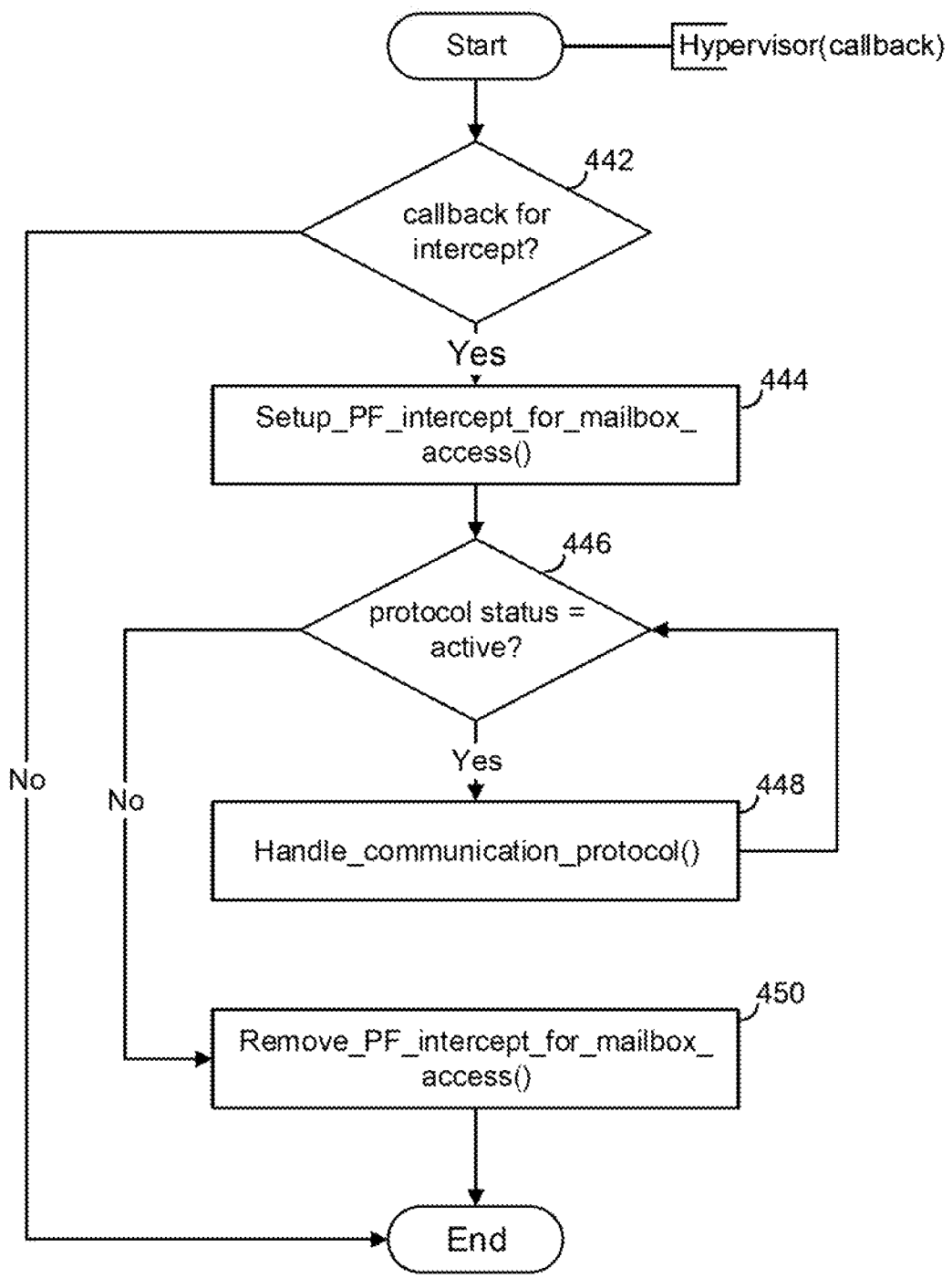

FIG. 4C depicts a flow of operations for hypervisor 111 performing the callback function. In step 442, hypervisor 111 tests the callback function to determine if the callback function is for an intercept operation. If the callback function is for an intercept operation, then in step 444, hypervisor 111 invokes intercept module 210 to call a Setup_PF_intercept_for_mailbox_access( ) function to setup a PF intercept for accessing the mailbox register in the memory-mapped I/O space by altering page permissions of an entry for the memory page containing the mailbox register. The PF intercept allows hypervisor 111 to override the PF driver's message handing. In step 446, intercept module 210 tests the status of the communication protocol between VF driver 202 and PF driver 206. If the status of the communication protocol is active, then in step 448, intercept module 210 handles the communication protocol by calling the Handle_communication_protocol( ) function, which is further described in reference to FIG. 4D. If the status of the protocol is completed ('not active') then, in step 450, intercept module 210 calls a Remove_PF_intercept_for_mailbox_access( ) function to alter the page table entry to remove the PF intercept for the memory page containing the mailbox register.

Figure 4D:
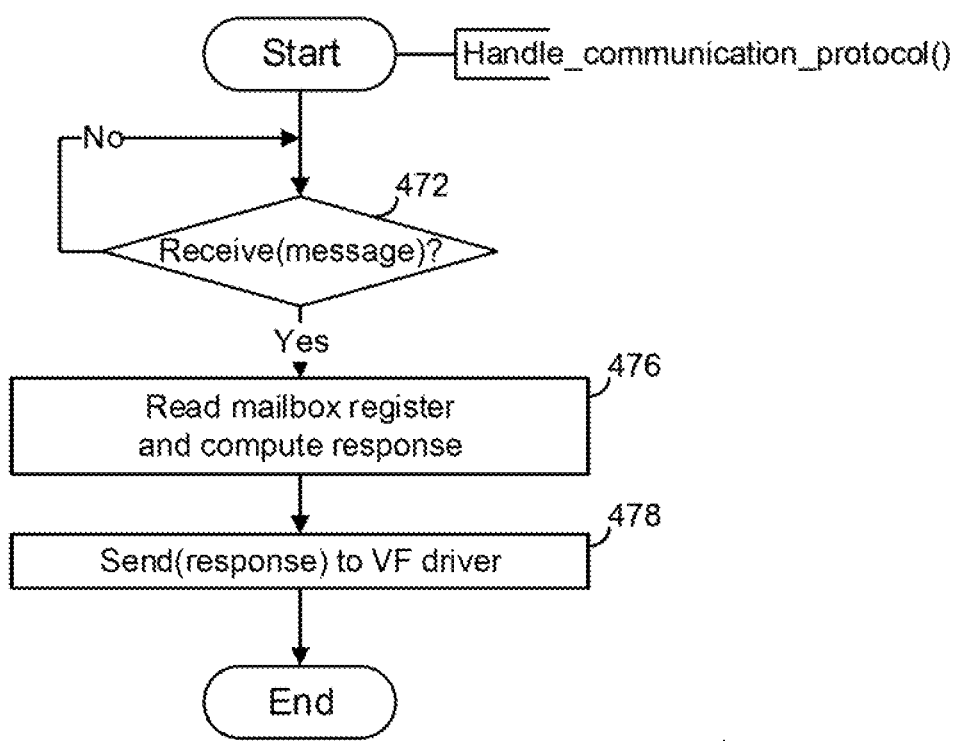

FIG. 4D depicts a flow of operations for the intercept module handling the communication protocol between VF driver 202 and PF driver 206. In step 472, intercept module 210 obtains a message when the Receive function indicates that a message is available. In step 476, intercept module 210 reads the mailbox register and computes an appropriate response. In step 478, intercept module 210 uses the Send function to send the response to VF driver 202. In accordance with the method of FIG. 4D, intercept module 210 is emulating the complete communication protocol between VF driver 202 and PF driver 206, i.e., intercept module 210 operates as if it were PF driver 206 communicating with the VF driver 202.

Thus, when the callback function passed as a parameter to hypervisor 111 is a callback for performing an intercept, intercept module 210 modifies page tables 208 so that access to a memory page containing the mailbox register of the MMIO device causes a PF intercept. The communication between the drivers is thereafter handled by intercept module 210, which, in effect, virtualizes the mailbox registers. That is, the mailbox register presented to VF driver 202 is not that of SR-IOV device 108 but instead that presented by intercept module 210.

After the communication protocol between the drivers has completed, intercept module 210 alters page tables 208 to remove the PF intercept when accessing the mailbox register in MMIO space of guest OS 130, thus returning the mailbox register presented to VF driver 202 to be again that of SR-IOV device 108.

In this manner, intercept module 210 (and thus hypervisor 111) has complete information about the communications with VF driver 202 and VF device 214n so that functions, such as providing a standardized view of VF device 214n to VMs and reporting of errors in the SR-IOV device, can be handled without loss in performance. In addition, intercept module 210 only operates over a short time, which is the duration of the communication protocol between VF driver 202 and VF device 214n. Thus, the overhead of guest memory access intercept is reduced, and performance of the SR-IOV device is maintained at a high level. Further, hypervisor 111 has knowledge of the complete state of the PF-VF communications so that, even without complete emulation, it can carry out checkpointing of the entire working state of VM 118$_1$, including the state of its PF-VF communications.

Figure 5A:
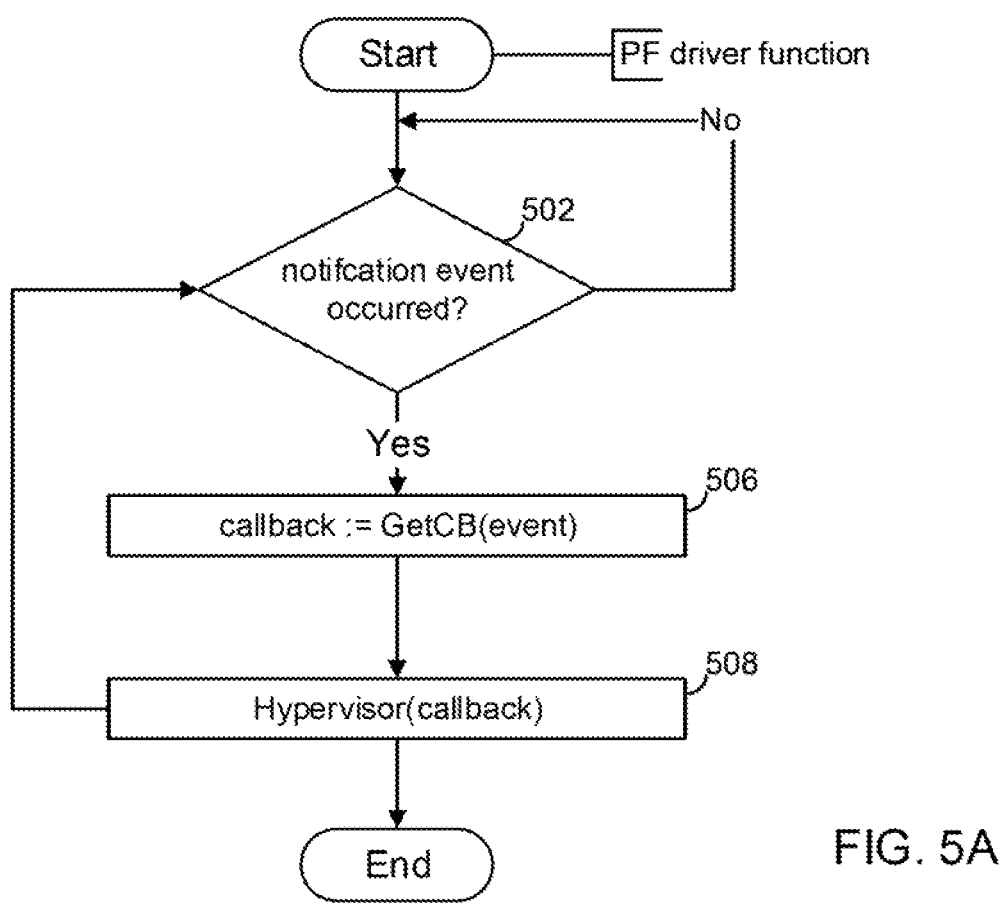
FIGS. 5A and 5B depict a flow of operations for a notification operation, in an embodiment.
Figure 5B:
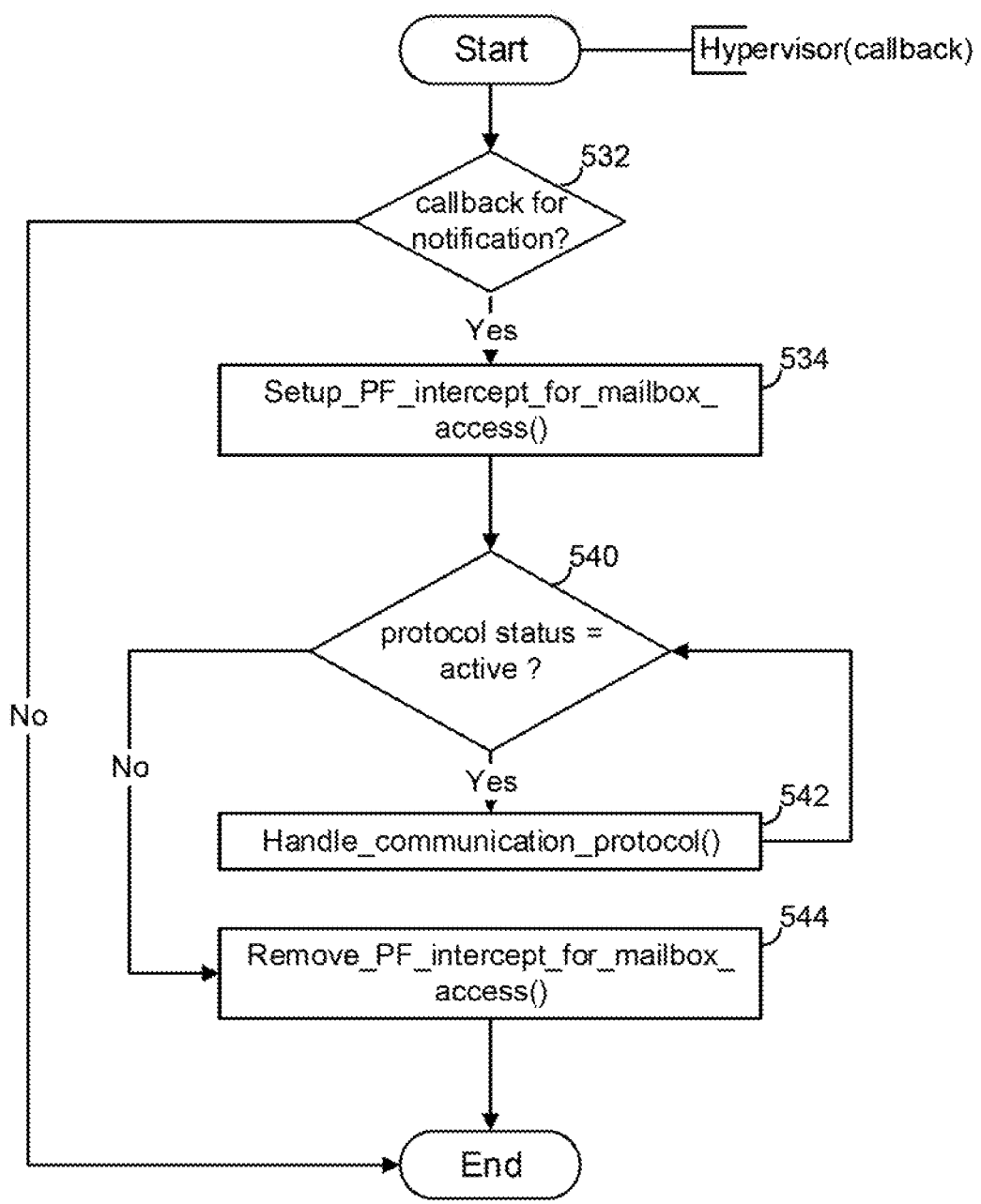

FIGS. 5A and 5B depict a flow of operations for a notification operation, in an embodiment. In a notification operation, an event that requires a notification to be sent to VF driver 202 has occurred in the SR-IOV device 108.

Referring to FIG. 5A, in step 502, PF driver 206 receives an indication from the SR-IOV device that a notification event has occurred. In step 506, PF driver 206 calls the GetCB function with the notification event as a parameter to obtain a callback function. In step 508, PF driver 206 calls hypervisor 111 with the callback function as a parameter.

Referring to FIG. 5B, in step 532, hypervisor 111 determines if the callback function is a callback for notification. If so, then in step 534, hypervisor 111 invokes intercept module 210 to call a Setup_PF_intercept_for_mailbox_access( ) function which alters a page table entry to cause a PF intercept for access to the memory page containing the mailbox register in the memory-mapped I/O space. In step 540, intercept module 210 determines the status of the communication protocol between VF driver 202 and PF driver 206. If the status is active, then intercept module 210 handles the communication protocol by calling the Handle_communication_protocol( ) function in step 542. The Handle_communication_protocol( ) function is similar to the Handle_communication_protocol( ) function of FIG. 4D. That is, a message is indicated as received by the Receive function, the message is read from the mailbox register, a response is computed based on the message and the response is sent to VF driver 202 by intercept module 210 invoking the Send function, just as PF driver 206 would if it were handling communication with VF driver 202. When the status of the protocol is not active, then in step 544, intercept module 210 invokes the Remove_PF_intercept_for_mailbox_access( ) function which alters the page table entry to remove the PF intercept for accessing the memory page containing the mailbox register.

Figure 6A:
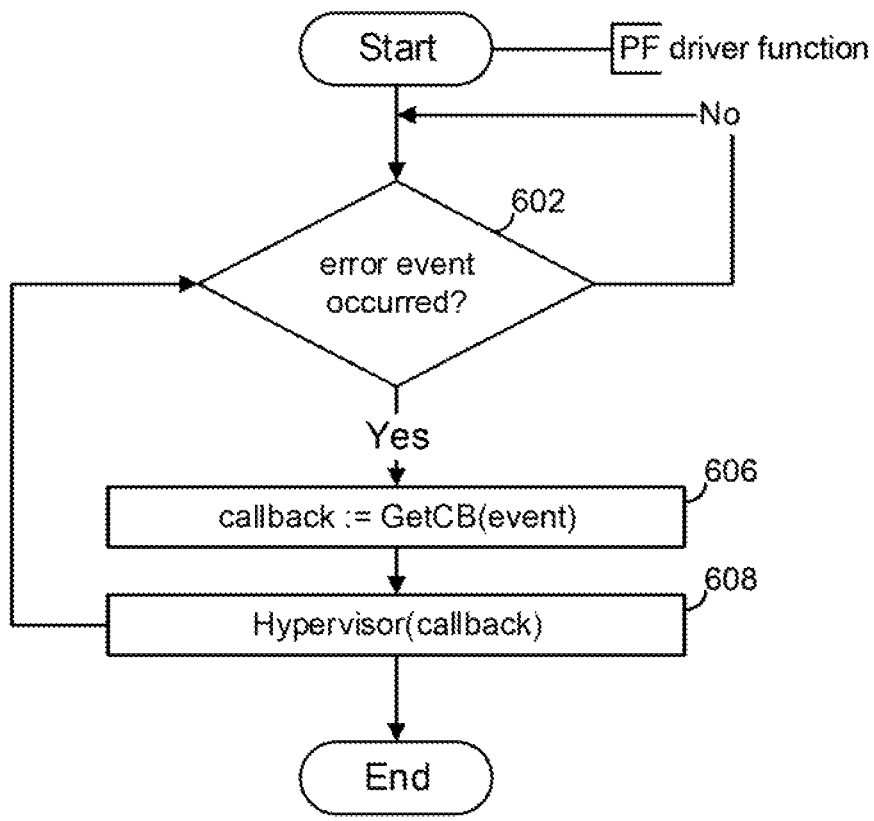
FIGS. 6A, 6B, and 6C depict a flow of operations for an error operation, in an embodiment.
Figure 6B:
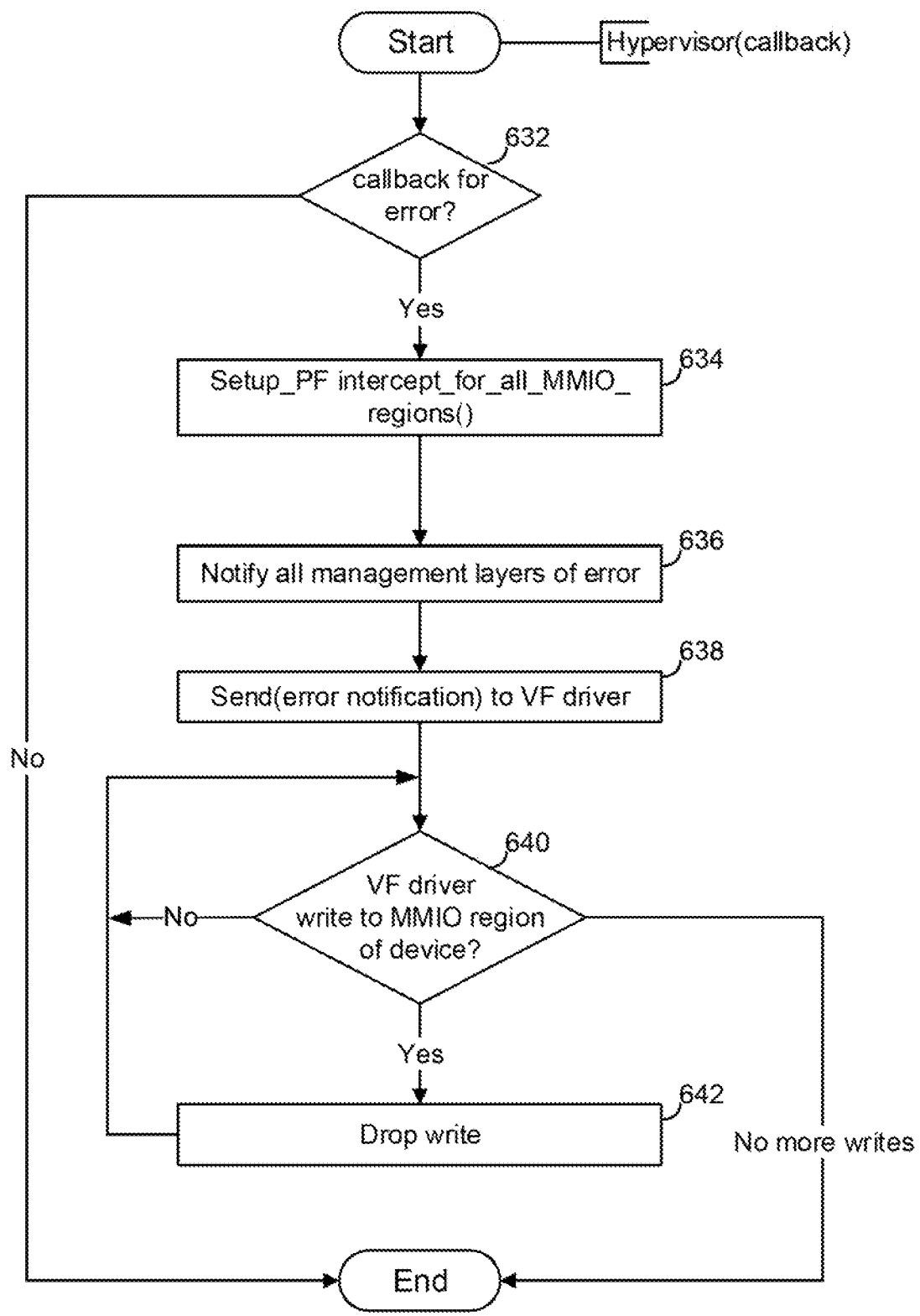
Figure 6C:
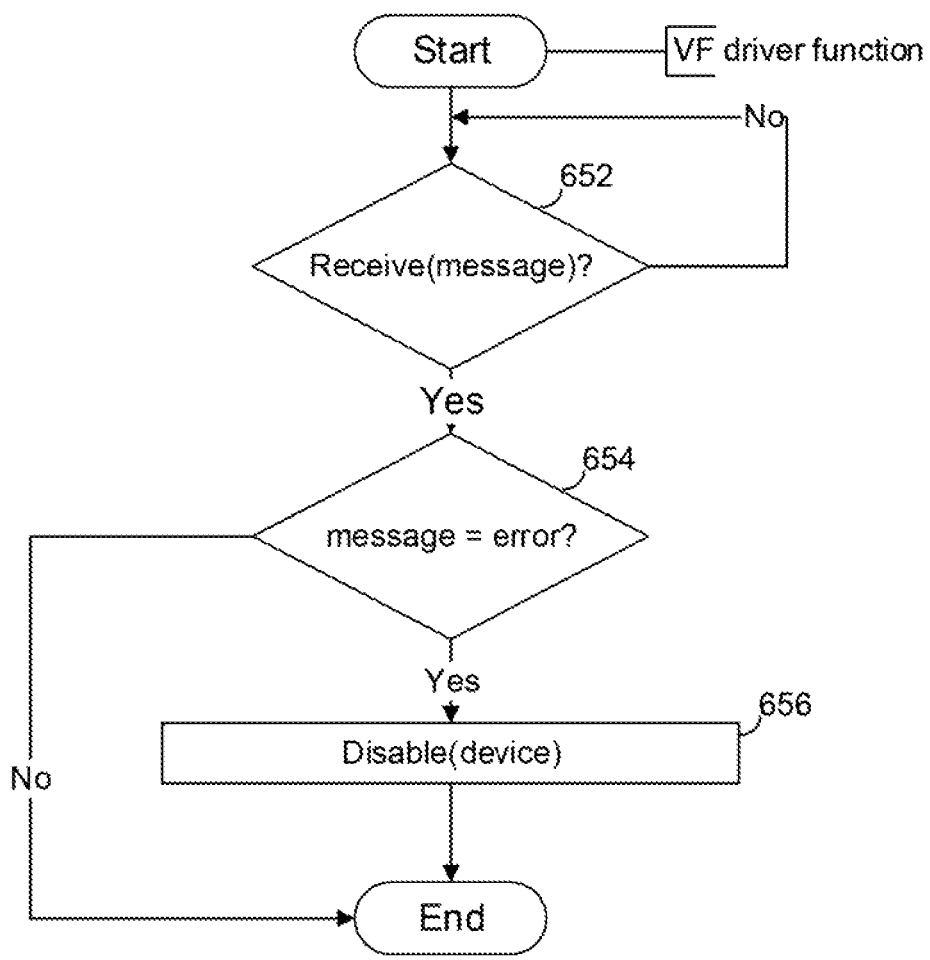

FIGS. 6A to 6C depict a flow of operations for an error operation, in an embodiment. In step 602 of FIG. 6A, PF driver 206 receives notice of an error event from the SR-IOV device 108. In step 606, PF driver 206 calls the GetCB( ) function with the error event as a parameter and obtains a callback function for the error event. In step 608, PF driver 206 calls hypervisor 111 with the callback function as the parameter.

Referring to FIG. 6B, in step 632, hypervisor 111 determines whether the callback is for an error in the SR-IOV device 108. If so, then in step 634, hypervisor 111 invokes intercept module 210 to call the Setup_PF_intercept_for_all_MMIO_regions( ) function which alters page tables 208 to cause PF intercept for all MMIO regions of the SR-IOV device. In step 636 hypervisor 111 cleans up virtual device resources and notifies all of the management layers of hypervisor 111 of the error. In step 638, intercept module 210 sends an error notification to VF driver 202. According to the decision block in step 640, if and when VF driver 202 writes to an MMIO region of the SR-IOV device, the write is dropped in step 642. The callback function completes when there are no more writes, e.g., when VF driver 202 has disabled the virtual device in response to receipt of the error notification.

Referring to FIG. 6C, VF driver 202 awaits a message in step 652 as indicated by the Receive function. If and when the message, which was sent by hypervisor 111 in step 638, is received, VF driver 202 determines whether the message is an error notification in step 654. If the message is an error notification, then in step 656, VF driver 202 calls Disable (device) to disable the SR-IOV device.

Thus, the embodiments described therein provide several improvements. First, the embodiments provide access to information about the state of an SR-IOV device so that a standardized view of the SR-IOV device and its capabilities can be presented to the VMs using the SR-IOV device. Second, the embodiments provide the virtualization software with information about the complete state of the PF-VF communications, so that even without complete emulation, the virtualization software can carry out checkpointing of the entire working state of the VMs, including the state of its PF-VF communications. Third, the embodiments provide virtualization software with information that the virtualization software needs when the SR-IOV device experiences an error condition.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of handling communications between a virtual machine that can directly operate an I/O device having a physical function (PF), virtual functions, and a mailbox register for communication with the I/O device, wherein the virtual machine has a guest driver for controlling one or more of the virtual functions and runs on system software that includes a physical driver for controlling the physical function of the I/O device and maintains page tables for the virtual machine, the page tables including an entry that references a memory space into which the mailbox register is mapped, the method comprising:

registering a callback function with the physical driver, wherein the callback function is to be invoked by the physical driver when the guest driver initiates communication via the mailbox register;

upon the guest driver initiating communication via the mailbox register and the physical driver invoking the callback function in response thereto, altering the entry in the page tables so that guest driver accesses to the mailbox register are intercepted;

emulating the communication with the guest driver via the mailbox register when the guest driver accesses to the mailbox register are intercepted; and upon completion of the communication with the guest driver, altering the entry in the page tables so that the guest driver accesses to the mailbox register are no longer intercepted and direct operation of the I/O device by the guest driver resumes.

2. The method of claim 1, wherein
the entry in the page tables corresponds to a memory page into which the mailbox register is mapped, and one or more other registers of the I/O device are also mapped into the page.

3. The method of claim 2, wherein the one or more other registers include registers used to submit workloads and monitor progress of the submitted workloads.

4. The method of claim 1, wherein the guest driver initiating communication via the mailbox register triggers an interrupt that causes the physical driver to invoke the callback function.

5. The method of claim 1, further comprising:
upon an event occurring in the I/O device, notifying the guest driver of the event via the mailbox register.

6. The method of claim 1, further comprising:
upon an error event occurring in the I/O device, notifying the guest driver to disable the one or more of the virtual functions.

7. The method of claim 6, further comprising:
when the error event occurs in the I/O device, ignoring guest driver accesses to the mailbox register.

8. A non-transitory computer readable medium storing instructions that are executable in a computer system that has a virtual machine instantiated therein, wherein the virtual machine can directly operate an I/O device having a physical function, virtual functions, and a mailbox register for communication, has a guest driver for controlling one or more of the virtual functions and runs on system software that includes a physical driver for controlling the physical function (PF) of the I/O device and maintains page tables for the virtual machine, the page tables including an entry that references a memory space into which the mailbox register is mapped, and wherein the instructions when executed cause the computer system to carry out a method of handling communications between the virtual machine and the I/O device, said method comprising:

registering a callback function with the physical driver, wherein the callback function is to be invoked by the physical driver when the guest driver initiates communication via the mailbox register;

upon the guest driver initiating communication via the mailbox register and the physical driver invoking the callback function in response thereto, altering the entry in the page tables so that guest driver accesses to the mailbox register are intercepted;

emulating the communication with the guest driver via the mailbox register when the guest driver accesses to the mailbox register are intercepted; and upon completion of the communication with the guest driver, altering the entry in the page tables so that the guest driver accesses to the mailbox register are no longer intercepted and direct operation of the I/O device by the guest driver resumes.

9. The non-transitory computer-readable medium of claim 8, wherein the entry in the page tables corresponds to a memory page into which the mailbox register is mapped, and one or more other registers of the I/O device are also mapped into the page.

10. The non-transitory computer-readable medium of claim 9, wherein the one or more other registers include registers used to submit workloads and monitor progress of the submitted workloads.

11. The non-transitory computer-readable medium of claim 8, wherein the guest driver initiating communication via the mailbox register triggers an interrupt that causes the physical driver to invoke the callback function.

12. The non-transitory computer-readable medium of claim 8, wherein the method further comprises:

upon an event occurring in the I/O device, notifying the guest driver of the event via the mailbox register.

13. The non-transitory computer-readable medium of claim 8, wherein the method further comprises:

upon an error event occurring in the I/O device, notifying the guest driver to disable the one or more of the virtual functions.

14. The non-transitory computer-readable medium of claim 13, wherein the method further comprises:

when the error event occurs in the I/O device, ignoring guest driver accesses to the mailbox register.

15. A computer system comprising:

a plurality of processors;

an I/O device having a physical function, virtual functions, and a mailbox register for communication; and a memory device storing instructions that are executed by the processors to provision system software that supports an execution space for virtual machines and to instantiate a virtual machine that runs in the execution space, wherein the virtual machine can directly operate the I/O device and includes a guest driver for controlling one or more of the virtual functions, and the system software includes a physical driver for controlling the physical function (PF) of the I/O device and maintains page tables for the virtual machine, the page tables including an entry that references a memory space into which the mailbox register of the I/O device is mapped, and wherein the instructions when executed cause the processors to carry out a method of handling communications between the virtual machine and the I/O device, said method comprising:

registering a callback function with the physical driver, wherein the callback function is to be invoked by the physical driver when the guest driver initiates communication via the mailbox register;

upon the guest driver initiating communication via the mailbox register and the physical driver invoking the callback function in response thereto, altering the entry in the page tables so that guest driver accesses to the mailbox register are intercepted;

emulating the communication with the guest driver via the mailbox register when the guest driver accesses to the mailbox register are intercepted; and upon completion of the communication with the guest driver, altering the entry in the page tables so that the guest driver accesses to the mailbox register are no longer intercepted and direct operation of the I/O device by the guest driver resumes.

16. The computer system of claim 15, wherein the entry in the page tables corresponds to a memory page into which the mailbox register is mapped, and one or more other registers of the I/O device are also mapped into the page.

17. The computer system of claim 16, wherein the one or more other registers include registers used to submit workloads and monitor progress of the submitted workloads.

18. The computer system of claim 15, wherein the guest driver initiating communication via the mailbox register triggers an interrupt that causes the physical driver to invoke the callback function.

19. The computer system of claim 15, wherein the method further comprises:

upon an event occurring in the I/O device, notifying the guest driver of the event via the mailbox register.

20. The computer system of claim 15, wherein the method further comprises:

upon an error event occurring in the I/O device, notifying the guest driver to disable the one or more of the virtual functions.

* * * * *